than six or seven months and my attachment will of course be practically indestructible on account of its infrequent use and for this reason I form it separate but it will of course be understood that it might be one with the shoe.

Again although I have shown my attachment in connection with a street car it will of course be understood that it may with equal facility be adapted for all classes of cars and would be particularly valuable when attached to the brake shoes of the wheels of railway passenger coaches.

What I claim as my invention is—

1. In combination with the brake shoe the angular frame, C, attached to the brake shoe by the bolts, $b$, $b'$, and having its upper end abutting the lug, $d$, as and for the purpose specified.

2. In combination with the brake shoe the angular frame, C, attached to the brake shoe by the bolts, $b$, $b'$, and having a rod, F, connected to each brake shoe and a bracing rod, G, extending from the outer end of the angular frame to a point on the rod as and for the purpose specified.

3. The brake shoe, B, having an angular frame, C, attached thereto, in combination with the L-shaped pin, D, chain, E, passing over the pulley, H, rod, I, chain, J, passing over the pulley, J', and having a ring, $j$, at its upper end and the lever, K, having a hooked end, $k'$, and normally held so as to support the brake shoe by the spring jaws, L, as and for the purpose specified.

JESSE JENNETT CASSIDEY.

Witnesses:
BLANCHE BOYD,
LEONARD FOULDS.